(12) United States Patent
McGean

(10) Patent No.: US 7,669,330 B1
(45) Date of Patent: Mar. 2, 2010

(54) METHOD FOR STRUCTURING A GEAR ASSEMBLY HOUSING

(76) Inventor: Jim McGean, 6271 Apache St., Westminster, CA (US) 92683

( * ) Notice: Subject to any disclaimer, the term of this patent is extended or adjusted under 35 U.S.C. 154(b) by 1271 days.

(21) Appl. No.: 11/177,985

(22) Filed: Jul. 8, 2005

Related U.S. Application Data

(63) Continuation-in-part of application No. 10/165,487, filed on Jun. 7, 2002, now abandoned.

(51) Int. Cl.
*B23P 15/14* (2006.01)
(52) U.S. Cl. ............... 29/893.2; 29/893.1; 29/898.07; 74/606 R; 475/248
(58) Field of Classification Search ............. 29/893.1, 29/893.2, 898.07, 898.09, 446; 74/606 R, 74/421 R; 475/248, 343
See application file for complete search history.

(56) References Cited

U.S. PATENT DOCUMENTS

| | | | | |
|---|---|---|---|---|
| 5,289,635 A | * | 3/1994 | Martin et al. | 29/893.1 |
| 5,950,500 A | * | 9/1999 | Okada et al. | 74/606 R |
| 6,053,838 A | * | 4/2000 | Gage | 475/248 |
| 6,058,793 A | * | 5/2000 | Pasley et al. | 74/421 A |
| 6,283,890 B1 | * | 9/2001 | Schleuder et al. | 475/343 |
| 6,623,867 B2 | * | 9/2003 | Crocco et al. | 428/614 |
| 6,813,972 B2 | * | 11/2004 | Guo | 74/606 R |
| 7,117,598 B2 | * | 10/2006 | Prucher | 29/893.2 |
| 7,155,824 B2 | * | 1/2007 | Prucher | 29/893.1 |
| 7,178,424 B2 | * | 2/2007 | Petruska et al. | 74/606 R |
| 7,464,626 B2 | * | 12/2008 | Yamazaki et al. | 74/606 R |

\* cited by examiner

*Primary Examiner*—Rick K Chang
(74) *Attorney, Agent, or Firm*—Dennis W Beech

(57) ABSTRACT

A method for structuring a gear assembly housing may include: identifying the lowest surface structure of ring gear teeth top lands; forming a lower gear housing portion having a wall positioned below a gear assembly centerline; shaping the wall relative to an axis of an axle to form: a convex curved wall segment adjacent the lowest surface structure joined to a first concave curved wall segment that is joined to a generally linear wall segment; a first transition wall segment that is joined to the generally linear wall segment; a ring gear wall segment of generally linear form joined to the convex curved wall segment; the ring gear wall segment joined to a second concave curved wall segment that transitions to a second transition wall segment; and attaching an upper housing portion.

5 Claims, 4 Drawing Sheets

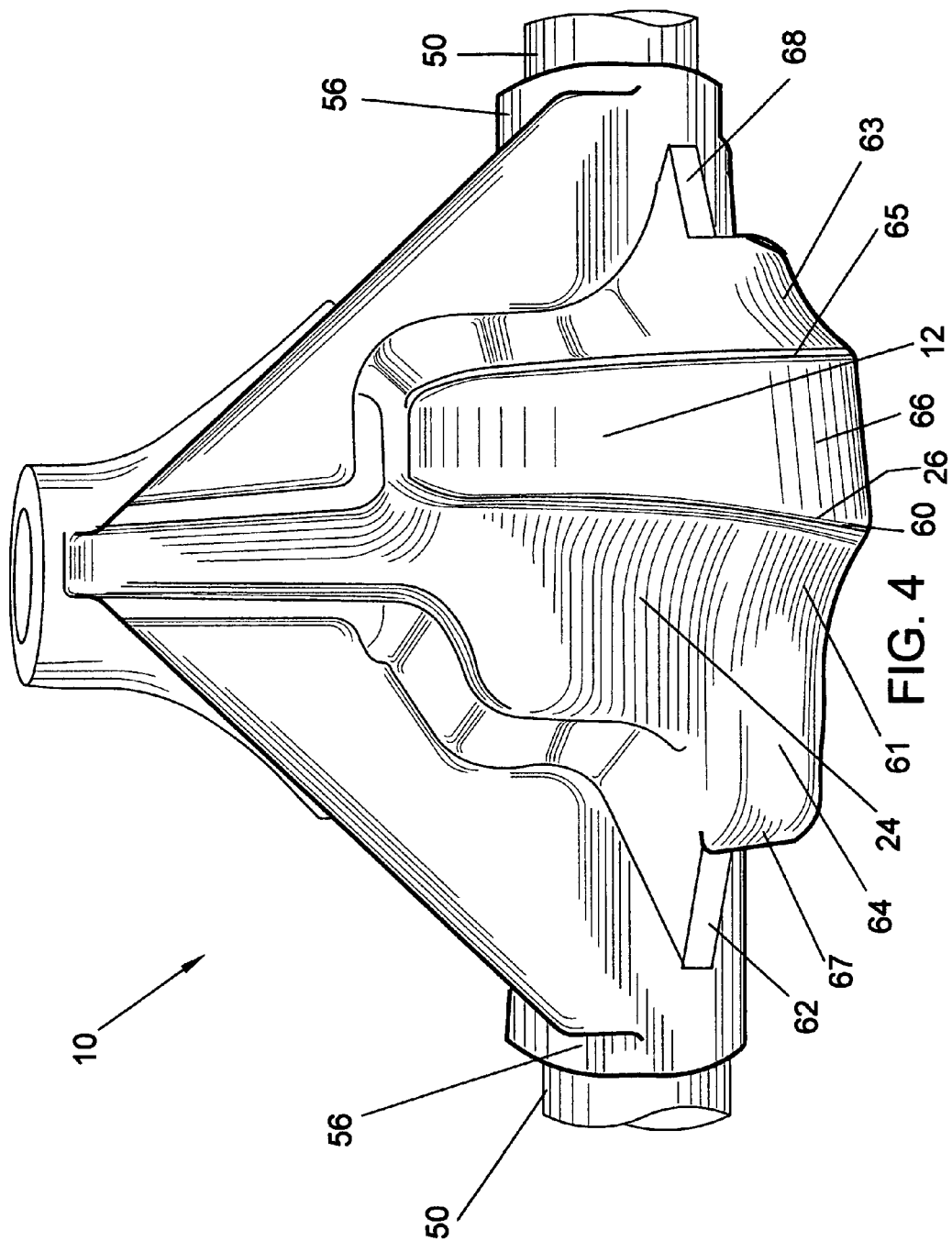

US 7,669,330 B1

METHOD FOR STRUCTURING A GEAR ASSEMBLY HOUSING

This is a continuation-in-part application of U.S. patent application Ser. No. 10/165,487 filed on Jun. 7, 2002. U.S. patent application Ser. No. 10/165,487 is now abandoned.

BACKGROUND OF THE INVENTION

This invention relates to housings for axle gear mechanisms for land mobile vehicles. The improved differential gear axle housing is structured to maximize the clearance between the bottom of the housing and the terrain over which the mobile vehicle may travel.

Gear axle housings have generally been structured in shapes approximating spheres, ovals or egg shapes and the like geometric three-dimensional structures. This may provide strength and ease of manufacturer for such housings. However, where terrain clearance is an issue, these shapes may not maximize the clearance, for example, for use with on/off road vehicles such as wheeled, tracked and like land mobile vehicles.

SUMMARY OF THE INVENTION

The present invention is directed to structures designed to house gear assemblies of land mobile vehicles. The gear housing may have an upper housing portion and a lower housing portion. The lower housing portion may have a wall reference position below a lowest surface structure of a gear assembly wherein a wall of smooth, generally non-planar surfaces may be positioned below a gear assembly centerline with an interior surface at the wall reference position adjacent the lowest surface structure with sufficient separation to avoid contact between the gear housing and the gear assembly. This separation between the gear housing and the gear assembly may allow for the tolerances and material temperature variations of the structural elements. The wall may have at least one concave curved segment to position the wall adjacent to a contour of outer surface structures of the gear assembly, but not contacting the gear assembly. An upper housing portion may be attached to the lower housing portion to enclose the gear assembly.

These and other features, aspects and advantages of the present invention will become better understood with reference to the following drawings, description and claims.

BRIEF DESCRIPTION OF THE DRAWINGS

FIG. 4 illustrates a bottom view of the gear housing according to an embodiment of the invention.

DETAILED DESCRIPTION

The following detailed description represents the best currently contemplated modes for carrying out the invention. The description is not to be taken in a limiting sense, but is made merely for the purpose of illustrating the general principles of the invention.

Figure 1:
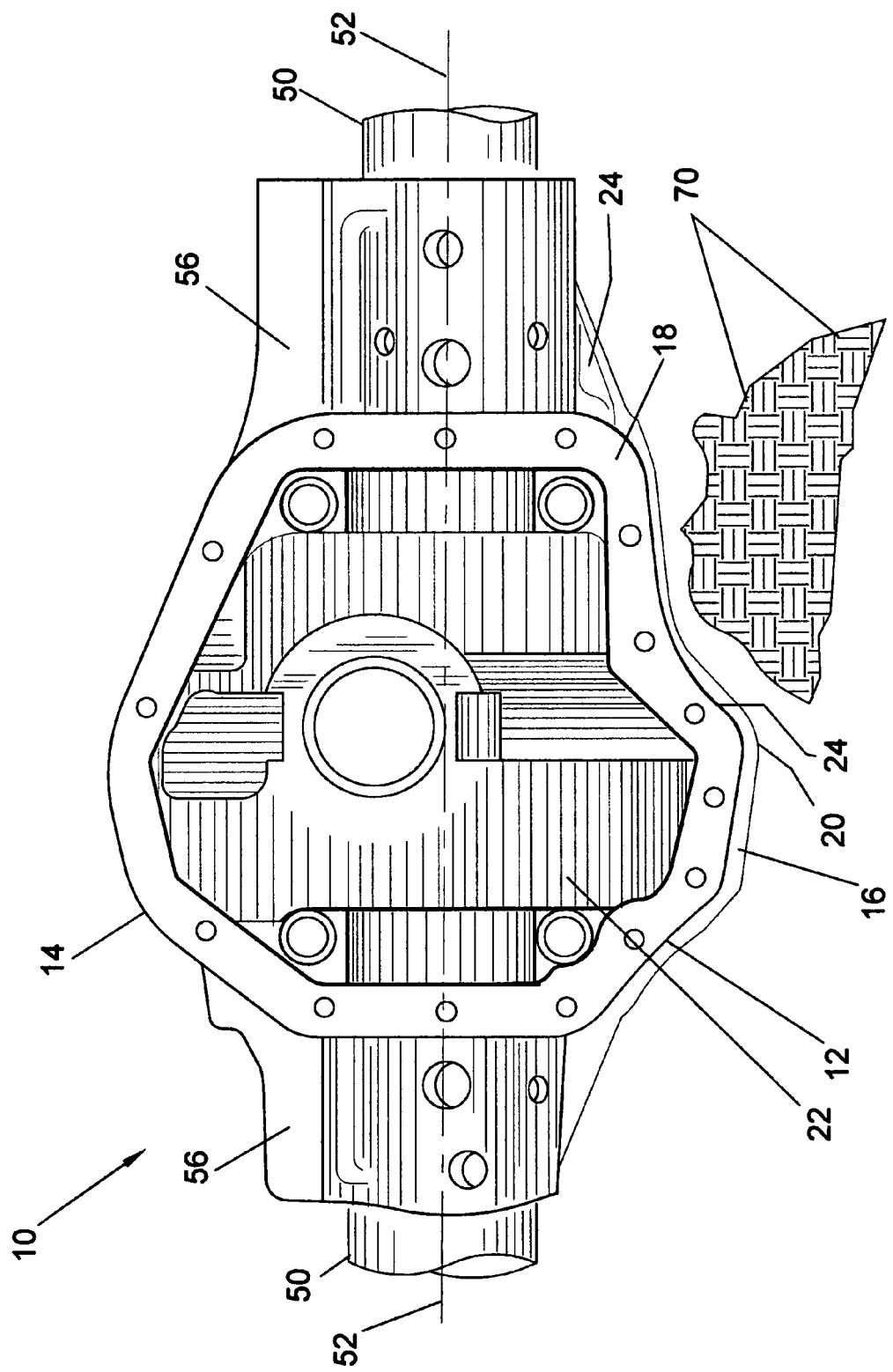
FIG. 1 illustrates an elevation side view of the gear housing with cover plate removed and without the gear assembly that may be attached to a rear axle assembly according to an embodiment of the invention.

Referring to FIG. 1, a rear axle differential gear housing 10 may be attached to a rear axle assembly and supporting drive apparatus (not shown). The gear housing 10 as part of a wheeled vehicle may travel on irregular terrain that may have large vertical variation characteristics such as rocks 70 or the ground. Often the vertical clearance between the terrain and the vehicle is defined by the gear housing 10 as it may protrude below the axle assembly 50. Any reduction in the portion of the gear housing 10 structure or exterior surface 24 protruding below the axle assembly 50 bottom surface may enhance the mobility of the vehicle.

The gear housing 10 may have a contoured lower housing portion 12 structure below the rear axle assembly 50 center line 52. This shape, as best viewed in FIG. 2, while having the typically shaped upper housing portion 14, has a lower housing portion shape that closely follows the contour of the gear elements outer surface 32 of the gear assembly 30. The differential or gear assembly 30 elements, such as, ring gear 34, ring gear mounting flange 38, carrier thrust bearing saddles 42 and the like, define a contour that a gear housing 10 with proper provision for structural strength may enclose in a form to maximize the clearance between the gear housing 10 bottom 16 and terrain that may be traversed.

Figure 2:
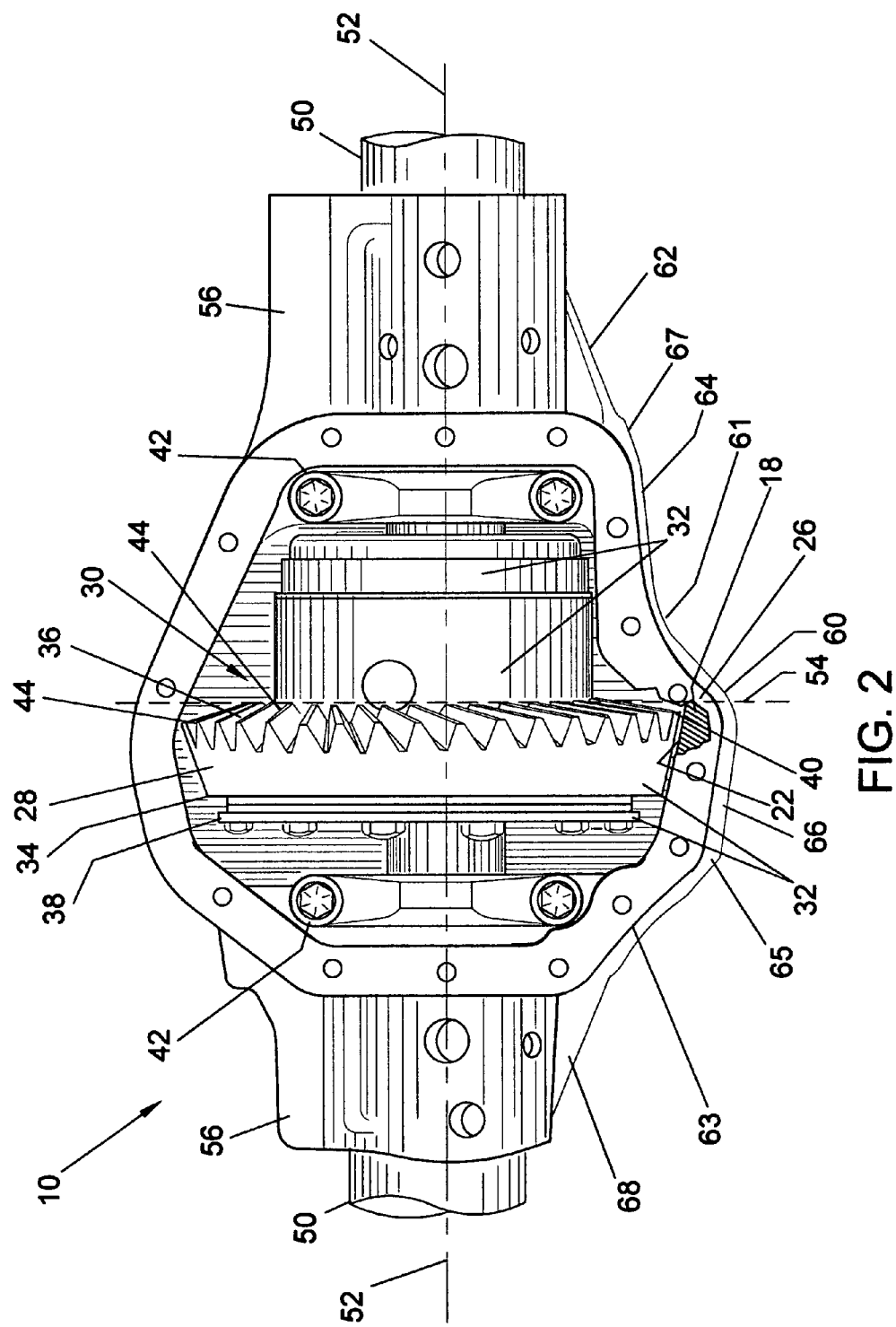
FIG. 2 illustrates an elevation side view of the gear housing opened to expose the gear assembly with a cover plate removed according to an embodiment of the invention.

Referring to FIGS. 2 and 4, the lower housing portion 12 may have a wall reference position 26 that may be vertically below the lowest surface structure 40 that may be the plane 54 of the ring gear top lands 44 of the ring gear teeth 36 of the gear assembly 30. The wall 18 may be formed of smooth, generally non-planar surfaces joined together to form the lower housing portion 12 with an interior surface 22 that may position the wall reference position 26 adjacent the lowest surface structure 40. The interior surface 22 may have sufficient separation distance to avoid contact between the gear housing 10 and the gear assembly 30. The separation distance may be related to the tolerances of materials associated with the gear assembly 30 and the gear housing 10 and any materials variation that may result from environmental changes such as temperature changes.

The separation distance for a particular housing found by experiment was approximately 0.035+/−0.025 inches between the interior surface 22 at the wall reference position 26 and the ring gear tooth top land 44 spin plane 54. Additionally, the separation distance for the ring gear wall segment 66 at the interior surface 22 and the ring gear outer diameter surface 28 was established at approximately 0.090+/−0.025 inches.

The wall 18 may have a convex curved wall segment 60 adjacent to the lowest surface structure 40 that may be joined to a concave curved wall segment 61 that may transition to a generally linear wall segment 64. These segments may be shaped to generally follow the contour of outer surface structures 32. There may be a first transition wall segment 62 joined to the generally linear wall segment 64 at a convex curved segment 67 and to an axle tube interface element 56. While the term curved segment may be used to describe the various segment shapes, other forms such as irregular partial polygons or faceted surface shapes may be used to achieve these segment forms, for example, a curve may be formed of relatively small linear segments joined to create a concave surface.

There may be a ring gear wall segment 66 that may be generally linear in form and approximately parallel and adjacent to a ring gear outer diameter surface 28. The ring gear wall segment 66 may be joined to the convex curved wall segment 60. There may be a concave curved wall segment 63 joined to the ring gear wall segment 66 at a convex curved ring gear wall segment 65. The concave curved wall segment 63 may transition to a transition wall segment 68 that may be attached to an axle tube interface element 56. These segments may be shaped to generally follow the contour of outer surface structures 32.

The concave curved wall segments 61, 63 may have curvatures such that there may be at least approximately 0.100 inches distance from a chord of said concave curved wall segments 61, 63 at the maximum separation joint from each respective chord.

Figure 3:
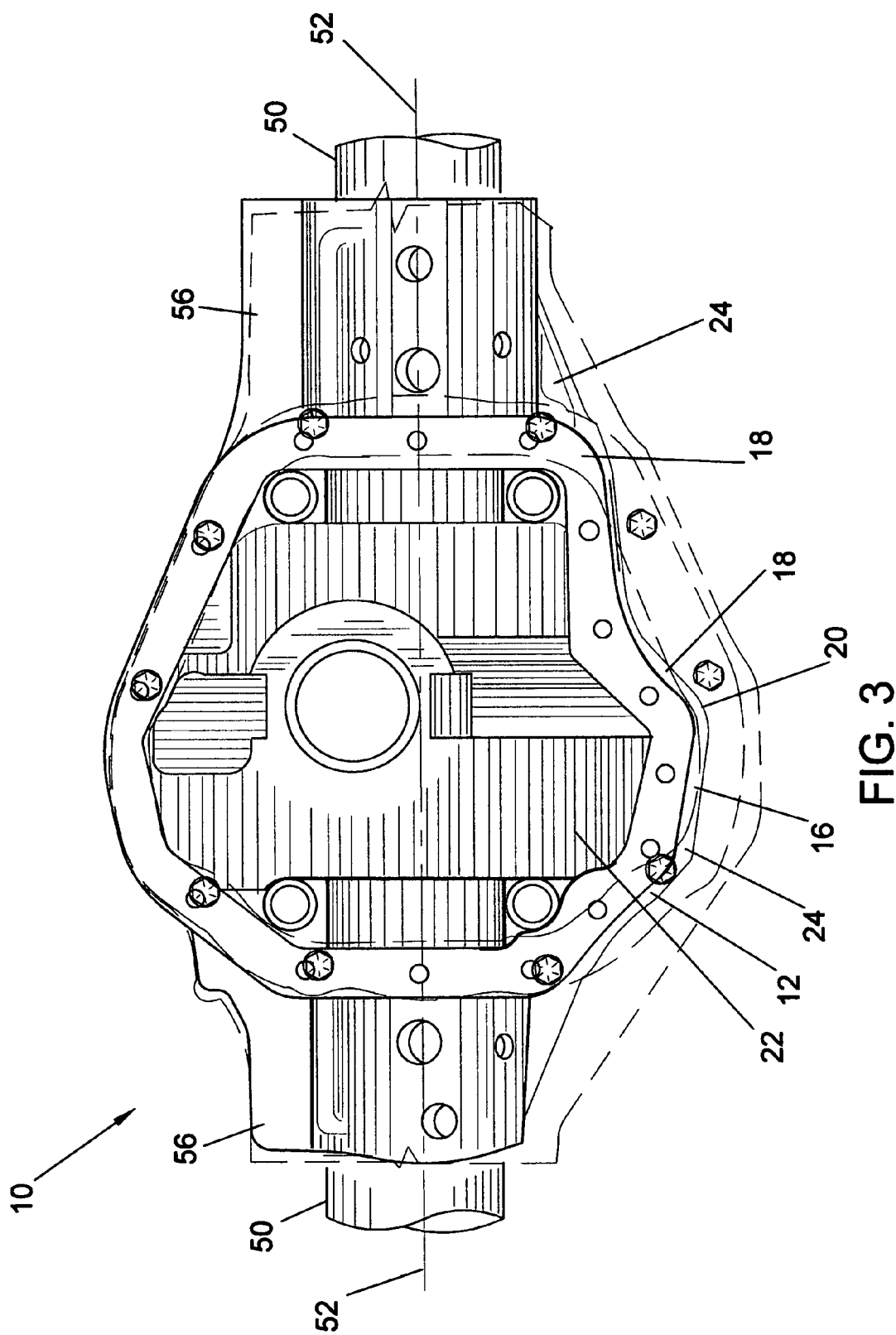
FIG. 3 illustrates an elevation side view of the gear housing according to an embodiment of the invention with dashed lined overlay of a conventional gear housing.

Referring to FIG. 3, the gear housing 10 may have a major lower peak structure at location 20 to accommodate the gear assembly. However, from this location 20 the remainder of the lower housing portion 12 may have the wall 18 distance below the axle assembly 50 minimized to structure the bottom 16 to allow clearance of obstacles. In a general volumetric sense this may provide approximately 30% more terrain clearance than typical gear housing structures as illustrated by the dashed line drawing in FIG. 3. To further strengthen the gear housing 10 for the variable shape wall, ductile iron may be used to fabricate the housing including a heat treatment process for part finishing.

While the invention has been particularly shown and described with respect to the illustrated embodiments thereof, it will be understood by those skilled in the art that the foregoing and other changes in form and details may be made therein without departing from the spirit and scope of the invention.

DIFFERENTIAL GEAR AXLE HOUSING CALL OOT LIST FOR DRAWING ELEMENTS 10 gear housing
12 lower housing portion
14 upper housing portion
16 housing bottom
18 wall
20 location peak
22 interior surface
24 exterior surface
26 wall reference position
28 ring gear outer diameter surface
30 gear assembly
32 gear elements outer surface
34 ring gear
36 ring gear teeth
38 ring gear mounting flange
40 lowest surface structure
42 carrier thrust bearing saddles
44 ring gear tooth top land
46
48
50 axle assembly
52 center line
54 spin plane
56 axle tube interface element
58
60 convex curved wall segment
61 first concave curved wall segment
62 transition wall segment
63 second concave curved wall segment
64 generally linear wall segment
65 convex curved ring gear wall segment
66 ring gear wall segment
67 convex curved segment
68 second transition wall segment
69
70 rocks

I claim:

1. A method for structuring a housing to enclose a gear assembly for attachment to an axle assembly of a land mobile vehicle comprising:
   identifying a lowest surface structure defined by a plurality of ring gear teeth top lands that define a spin plane of a gear assembly relative to a vertical axis perpendicular to a horizontal plane that would be tangent to a bottom of a plurality of wheels of a land vehicle;
   forming a lower gear housing portion having a wall of smooth, generally non-planar surfaces positioned below a gear assembly centerline with an interior surface adjacent said lowest surface structure that does not contact said lowest surface structure;
   shaping said wall relative to an axis of an axle of said land vehicle to form:
   a convex curved wall segment adjacent to said lowest surface structure joined to a first concave curved wall segment that transitions to a generally linear wall segment that is adjacent said gear assembly;
   a first transition wall segment is joined to said generally linear wall segment and to an axle tube interface element;
   a ring gear wall segment that is of generally linear form and approximately parallel to a ring gear outer diameter surface and said ring gear wall segment joined to said convex curved wall segment;
   said ring gear wall segment opposite said convex curved wall segment joined to a second concave curved wall segment that transitions to a second transition wall segment that is attached to an axle tube interface element;
   wherein said wall is positioned adjacent to a contour of outer surface structural surfaces of said gear elements, but not contacting said gear elements; and
   attaching an upper housing portion to said lower housing portion to enclose said gear assembly.

2. The method as in claim 1 wherein said interior surface is not more than 0.035+/−0.025 inches distance from said lowest surface structure.

3. The method as in claim 1 wherein there is less than 0.090+/−0.025 inches distance from said ring gear outer diameter surface to an interior surface of said ring gear wall segment.

4. The method as in claim 1 wherein said first concave curved wall segment is at least 0.100 inches distance from a chord of said first concave curved wall segment at the maximum separation point from said chord.

5. The method as in claim 1 wherein said second concave curved wall segment is at least 0.100 inches distance from a chord of said second concave curved wall segment at the maximum separation point from said chord.

* * * * *